United States Patent [19]

Mizusawa et al.

[11] Patent Number: 4,458,953
[45] Date of Patent: Jul. 10, 1984

[54] HYDRAULIC BRAKING PRESSURE CONTROL DEVICE

[75] Inventors: Mitutoyo Mizusawa, Ueda; Koichi Miyasaka, Koushoku, both of Japan

[73] Assignee: Nissin Kogyo Kabushiki Kaisha, Nagano, Japan

[21] Appl. No.: 367,172

[22] Filed: Apr. 12, 1982

[30] Foreign Application Priority Data

Apr. 18, 1981 [JP] Japan .................... 56-58735
May 15, 1981 [JP] Japan .................... 56-70363[U]
Sep. 29, 1981 [JP] Japan .................... 56-154159

[51] Int. Cl.³ .............................. B60T 8/26
[52] U.S. Cl. .................... 303/6 C; 188/349
[58] Field of Search .......... 303/6 C, 6 R, 84 A, 303/84 R; 188/349, 345, 151 A

[56] References Cited

U.S. PATENT DOCUMENTS

| | | | |
|---|---|---|---|
| 3,627,385 | 12/1971 | Stokes | 303/6 C |
| 3,975,060 | 8/1976 | Hirayama | 303/6 C |
| 3,977,731 | 8/1976 | Kasahara | 303/6 C |
| 4,212,498 | 7/1980 | Kawaguchi | 303/6 C |

*Primary Examiner*—Douglas C. Butler

*Attorney, Agent, or Firm*—Armstrong, Nikaido, Marmelstein & Kubovcik

[57] ABSTRACT

An improved hydraulic braking pressure control device for a dual braking system including a pair of first and second hydraulic lines extending from a dual type brake master cylinder to the front and rear wheel brakes. The device includes a common housing mounted across the first and second hydraulic lines, and a pair of differential pistons slidably received in the aligned cylinder bores in the housing to respectively define on their opposite sides a first input and a first output hydraulic chamber and a second input and a second output hydraulic chamber, the adjacent input and output chambers being in communication with each other through respective valves which are operated to open and close by a pair of valve actuating pistons slidably fitted in the respective input chambers. A pressure control spring is arranged between the differential pistons to urge them in the direction away from each other. The valve actuating pistons are each operatively connected with the valves through a pair of connector assemblies with a predetermined amount of free displacement distance formed therebetween so as to allow free movements of the differential pistons within a definite range.

8 Claims, 6 Drawing Figures

HYDRAULIC BRAKING PRESSURE CONTROL DEVICE

BACKGROUND OF THE INVENTION

1. Field of the Invention

The present invention relates to a hydraulic braking pressure control device incorporated in a braking system for a vehicle in which two independent hydraulic lines are extended from a dual type master cylinder to front and rear wheel brakes, and more particularly relates to a hydraulic braking pressure control device which is constructed such that the rear wheel brakes are supplied with a hydraulic pressure lower than that for the front wheel brakes.

2. Description of the Prior Art

A conventional type of braking system for a vehicle is typically illustrated in FIG. 1 in which pairs of diagonally located front and rear wheel brakes $B_f$, $B_r'$ and $B_f'$, $B_r$ are connected to one another by way of the mutually independent first and second hydraulic lines $L_1$ and $L_2$ both of which extend from the delivery ports of the master cylinder M. Further, another conventional type of braking system is constructed such that the front wheel brakes $B_f$ and $B_f'$ are each provided with two hydraulic braking mechanisms which are connected with the first and second hydraulic lines $L_1$ and $L_2$, respectively. With this braking system, in order to ensure that effective braking is effected by automatically reducing hydraulic pressure for the rear wheel brakes at a certain ratio relative to that for the front wheel brakes when rear wheel load is decreased due to forward inclination of the vehicle body during powerful braking operation, there is provided a hydraulic braking pressure control device V which is disposed commonly in the first and second hydraulic lines $L_1$ and $L_2$ extending from the master cylinder M to the rear wheel brakes $B_r$ and $B_r'$.

It has been hitherto pointed out with the conventional braking system that this type of control device V has to be provided with a by-pass function in order that the intended powerful braking is attained for both the front and rear wheels merely by one of two hydraulic lines when the other one fails to be properly operated.

SUMMARY OF THE INVENTION

The present invention is intended to satisfactorily meet the requirement as mentioned above by means of a novel hydraulic braking pressure control device having the intended by-pass function, which is simple in structure and small in size.

It is an object of the present invention to provide a new and unique hydraulic braking pressure control device which has a by-pass function by which powerful braking is ensured for both the front and rear wheels merely be either of two hydraulic lines when the other one is put out of operation.

It is another object of the present invention to provide a hydraulic braking pressure control device which is simple in structure and is manufactured at an inexpensive cost.

It is a further object of the present invention to provide a hydraulic braking pressure control device which operates reliably and safely.

In order to achieve the above objects, the present invention provides a hydraulic braking pressure control device in a braking system for a vehicle in which hydraulic output pressure from a master cylinder is separately fed to a pair of rear wheel brakes by way of independent first and second hydraulic lines, the device comprising in combination;

a housing disposed commonly in said first and second hydraulic lines and having a cylinder bore defined therein;

a pair of differential pistons slidably received in said cylinder bore to define at their inner ends a first and a second hydraulic input chamber in communication with the upstream sides of said first and second hydraulic lines, respectively, and at their outer ends a first and a second hydraulic output chamber in communication with the downstream sides of said first and second hydraulic lines, respectively, said differential pistons each having on the opposite sides thereof a first pressure receiving area facing the associated one of said hydraulic output chambers and a second pressure receiving area facing the associated one of said hydraulic input chambers, said first pressure receiving area being greater than said second pressure receiving area, said differential pistons being each formed with a communication passage through which said associated hydraulic input and output chambers communicate with each other;

a pair of valves adapted to open or close said communication passages in accordance with the sliding movements of said respective differential pistons; and a valve actuating means arranged between said first and second hydraulic input chambers and adapted to keep one of said valves in an open state when it is moved under a pressure differential between said first and second hydraulic input chambers by a distance greater than a predetermined value.

With the above arrangement, the valves for controlling the rear wheel braking pressure are moved to an open position when the valve actuating piston means is caused under a pressure differential between the two hydraulic lines to displace a distance larger than a predetermined level. Accordingly, most effective braking is always ensured during the normal operation of the two hydraulic lines and when either of the two hydraulic lines is put into trouble, the other normally operating hydraulic line undertakes a by-pass function so that the rear wheels are braked by the same braking force as that of the front wheels thereby to enable the vehicle to stop in a safe and reliable manner. In addition, the hydraulic braking pressure control device of the invention does not result in any complicated structure as compared with the conventional one.

BRIEF DESCRIPTION OF THE ACCOMPANYING DRAWINGS

DESCRIPTION OF A PREFERRED EMBODIMENT

Now the present invention will be described in more details with reference to the accompanying drawings which illustrate a preferred embodiment of the present invention.

Figure 1:
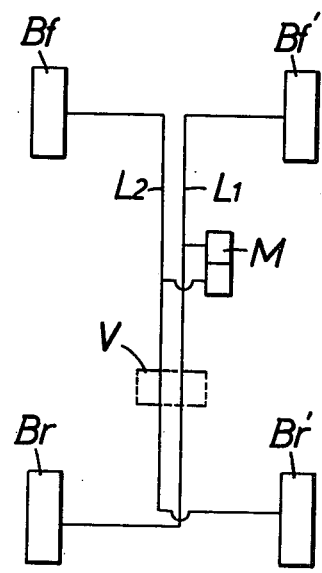
FIG. 1 is a diagramatic illustration of a hydraulic circuit in a braking system for a vehicle.

FIG. 1 schematically illustrates a hydraulic circuit for a braking system mounted on a vehicle, wherein the first hydraulic line $L_1$ extending from the delivery port of a dual type brake master cylinder M is connected to diagonally disposed front and rear wheel brakes $B_f$ and $B_r$, while the second hydraulic line $L_2$ extending from the master cylinder M is connected to another diagonally disposed front and rear wheel brakes $B_f'$ and $B_r'$, with a hydraulic braking pressure control device V connected across the first and second hydraulic lines $L_1$ and $L_2$.

The hydraulic braking pressure control device V is intended to ensure effective braking operation by automatically reducing hydraulic pressure for the respective rear wheel brakes at a certain ratio relative to that of the respective front wheel brakes in the same hydraulic line when strong braking is applied to cause a forward inclination of the vehicle body to substantially reduce the load exerted on the rear wheels.

Now the hydraulic braking pressure control device V will be described in a greater detail with reference to FIG. 2.

Figure 2:
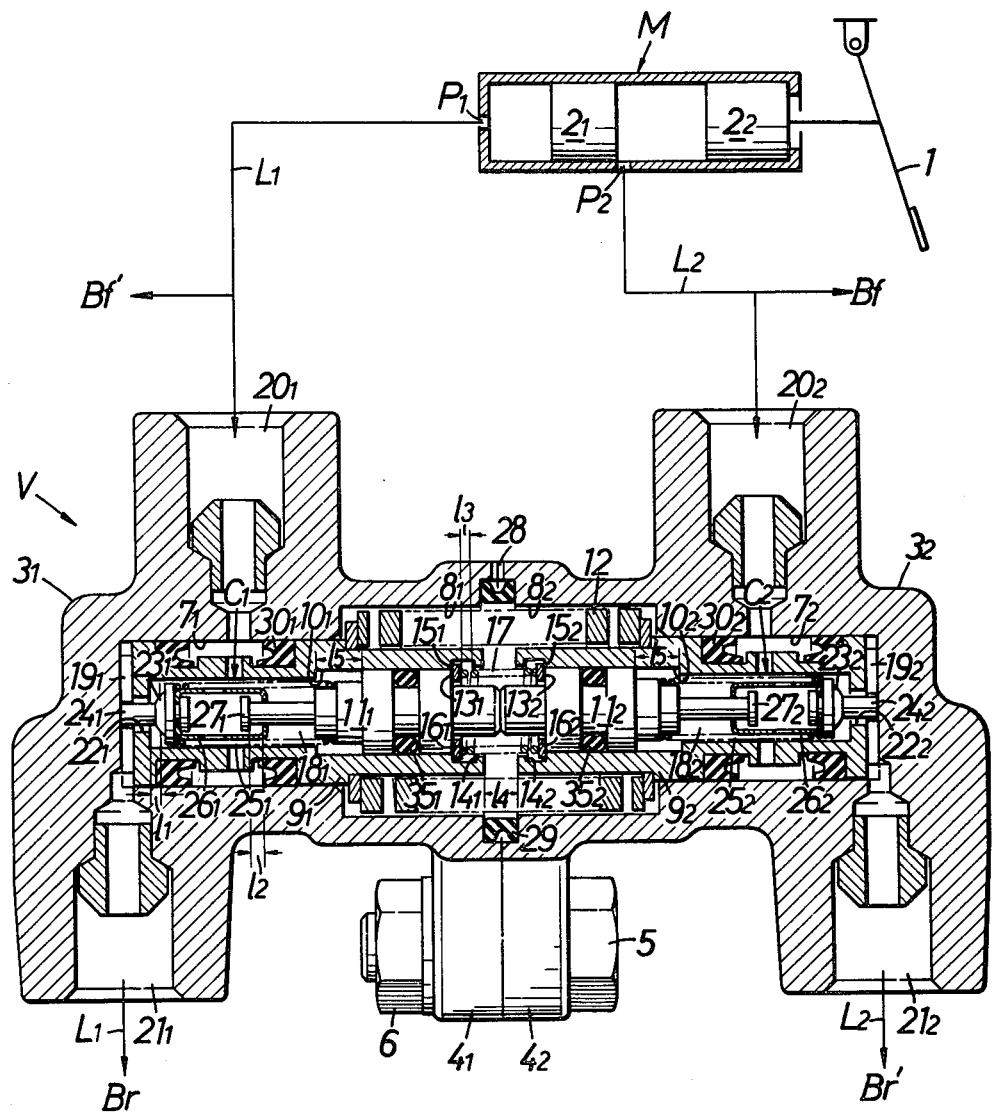
FIG. 2 is a vertical sectional view of a hydraulic braking pressure control valve in accordance with a preferred embodiment of the present invention.

The dual type brake master cylinder M is designed in a tandem fashion, as is schematically illustrated at the upper part of FIG. 2. Specifically, when a brake pedal 1 is depressed, a pair of pistons $2_1$ and $2_2$, arranged in alignment one after another in the cylinder, deliver pressurized liquid to the first and second hydraulic lines $L_1$ and $L_2$ by way of the first and second delivery ports $P_1$ and $P_2$. A part of pressurized liquid delivered from the master cylinder is conducted to the front wheel brakes $B_f$ and $B_f'$, while the remaining part of the liquid is conducted to the hydraulic braking pressure control device V.

As is apparent from FIG. 2, the hydraulic braking pressure control device V is symmetrically designed, of which housings $3_1$ and $3_2$ are connected to one another at flanges $4_1$ and $4_2$ by means of bolts 5 and nuts 6. The respective housings $3_1$ and $3_2$ have cylinder bores $7_1$ and $7_2$ and larger bores $8_1$ and $8_2$ formed therein. In the cylinder bores $7_1$ and $7_2$ are slidably fitted a pair of differential pistons $9_1$ and $9_2$ of the same diameter. The differential pistons $9_1$ and $9_2$ are formed with smaller cylinder bores $10_1$ and $10_2$, respectively, in which valve actuating pistons $11_1$ and $11_2$ are slidably received with their rear faces in contact with one another. Between the differential pistons $9_1$ and $9_2$ are arranged under compression a coil spring 12 having a high resiliency, whereas between the valve actuating pistons $11_1$ and $11_2$ is arranged under compression a positioning spring 17 in the form of a coil spring having a relatively weak resiliency with washers $16_1$ and $16_2$ disposed therebetween in abutment against the outer shoulders $13_1$ and $13_2$ in the valve actuating pistons $11_1$ and $11_2$, the washers $16_1$ and $16_2$ being axially displaceable between axially spaced, opposing shoulders $14_1$, $15_1$ and $14_2$, $15_2$ in the smaller cylinder bores $10_1$ and $10_2$.

In the smaller cylinder bores $10_1$ and $10_2$ are formed a first and a second hydraulic input chamber $18_1$ and $18_2$ as defined by the outer ends of the valve actuating pistons $11_1$ and $11_2$, whereas in the cylinder bores $7_1$ and $7_2$ are formed a first and a second hydraulic output chamber $19_1$ and $19_2$ as defined by the outer ends of the differential pistons $9_1$ and $9_2$. The differential pistons $9_1$, $9_2$ have on the opposite sides thereof a first pressure receiving area exposed to the associated hydraulic output chamber and a second pressure receiving area exposed to the associated hydraulic input chamber, the first pressure receiving area being greater than the second pressure receiving area. The first and second hydraulic input chambers $18_1$ and $18_2$ are normally in communication with the upstream portions of the first and second hydraulic lines $L_1$ and $L_2$ via inlet ports $20_1$ and $20_2$, whereas the first and second hydraulic output chambers $19_1$ and $19_2$ are normally in communication with the downstream portions of the first and second hydraulic lines $L_1$ and $L_2$ via outlet ports $21_1$ and $21_2$.

Formed through the end walls of the smaller cylinder bores $10_1$ and $10_2$ are communication holes $22_1$ and $22_2$ through which the hydraulic input chambers $18_1$ and $18_2$ and the hydraulic input chambers $19_1$ and $19_2$ are respectively in fluid communication with each other. Valve opening rods $24_1$ and $24_2$ projected from valves $23_1$ and $23_2$ extend through said communication holes $22_1$ and $22_2$. Coil springs $25_1$ and $25_2$ are disposed in a compressed state between the valves $23_1$ and $23_2$ and the valve actuating pistons $11_1$ and $11_2$ in such a manner as to resiliently urge the former away from the latter. Normally, the valve opening rods $24_1$ and $24_2$ come in abutment against the end walls of the cylinder bores $7_1$ and $7_2$ whereby the valves $23_1$ and $23_2$ are kept in a opened state with the differential pistons $9_1$ and $9_2$ slidably displaced to the outermost position. When the differential pistons $9_1$ and $9_2$ are moved under differential pressure in the inward direction, the valves $23_1$ and $23_2$ come in abutment against the end walls of the smaller cylinder bores $10_1$ and $10_2$ to close the communication holes $22_1$ and $22_2$.

Figure 3:
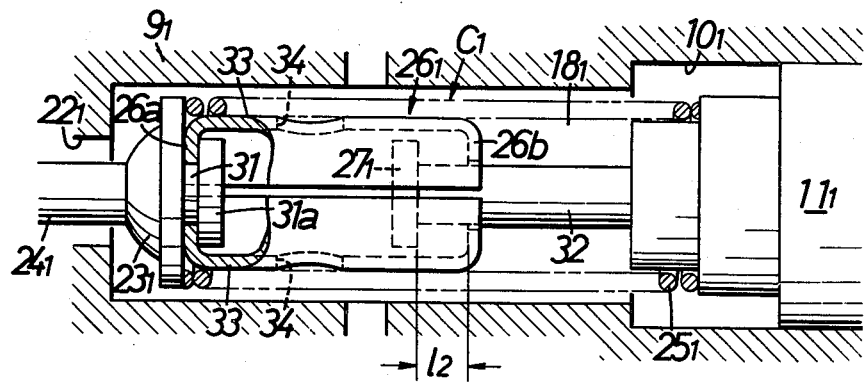
FIG. 3 is a vertical sectional view of a connector assembly incorporated in the device in FIG. 2, shown in an enlarged scale.

As is apparent from FIG. 3, the valves $23_1$ and $23_2$ and the valve actuating pistons $11_1$ and $11_2$, located in spaced opposite relation, are operatively connected by means of specially designed connector assemblies $C_1$ and $C_2$. Since the connector assemblies $C_1$ and $C_2$ are constructed in a symmetrical manner, description will be made only with respect to the left-hand connector assembly $C_1$ (see FIGS. 3 and 4).

The valve $23_1$ is provided with a short connecting rod 31 extending from the end face thereof toward the oppositely located valve actuating piston $11_1$ with a flange-shaped stopper $31a$ integrally formed at its forward end, whereas the valve actuating piston $11_1$ is provided with a long connecting rod 32 extending from the end face thereof toward the oppositely located valve $23_1$ with a flange-shaped stopper $27_1$ at its forward end. The connecting rods 31 and 32 extend through the opposite end walls $26a$ and $26b$ of a cylindrical hollow connector $26_1$. Specifically, the end wall $26a$ of the connector $26_1$ is substantially fixed to the connecting rod 31, because it is firmly clamped between the end wall of the valve $23_1$ and the inside face of the flange-shaped stopper $31a$, whereas the other end wall $26b$ is free to slide on the connecting rod 32 of the valve actuating piston $11_1$ and normally there is provided a clearance $l_2$ between the end wall $26b$ and the inside face of the flange-shaped stopper $27_1$ for permitting free movement therebetween.

Figure 4:
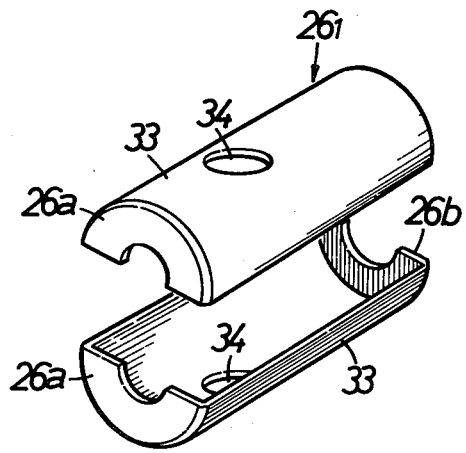
FIG. 4 is a perspective view of connector halves for the assembly in FIG. 3, shown in a disassembled state.

As shown in FIG. 4 the connector $26_1$ is constructed of two connector segments or halves 33 each in the form of a half-cylinder cut off in a horizontal plane including the longitudinal axis of the connector and the intended cylindrical configuration of the connector $26_1$ is ensured by means of the coil spring 25 which encases the two halves 33. It should be noted that it is preferable to form holes 34 in the respective halves 33 or keep a close clearance between the oppositely disposed joint edges of the halves 33 in order to ensure that no air bubble is kept within the connector $26_1$.

The connector assembly $C_1$ is fabricated as follows. First, the coil spring 25 is fitted onto the valve actuating piston $11_1$ in a compressed state and then the two connector halves 33 are mounted onto the connecting rods 31 and 32 from both the upper and lower sides so that they are assembled on the stoppers $31a$ and $27_1$ without any particular difficulty. Thereafter, the coil spring $25_1$ is released from the compressed state so that it is expanded to encase the connector $26_1$ and urge the valve $23_1$ outwardly away from the piston $11_1$.

Figure 5:
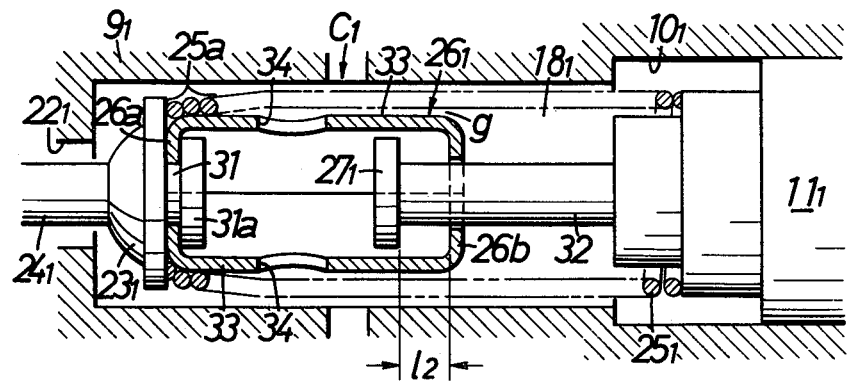
FIG. 5 is a view similar to FIG. 3, showing a modified form of connector assembly.
Figure 6:
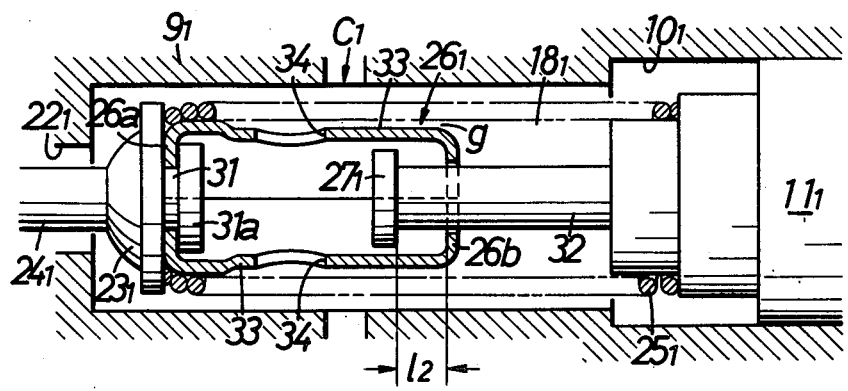
FIG. 6 is a view similar to FIG. 3, showing a further modified form of connector assembly.

FIGS. 5 and 6 illustrate two modified form of connectors, respectively. In these modifications, one end of the coil spring $25_1$ is firmly fitted onto the left end part of the connector $26_1$, while the remainder of the coil spring $25_1$ is arranged on the connector $26_1$ with an annular clearance g formed therebetween. Owing to such an arrangement, it is ensured that the connector $26_1$ keeps the intended cylindrical configuration and at the same time the coil spring $25_1$ effects compression and expansion without any interference caused by the connector $26_1$.

Specifically, in the FIG. 5 modification, the coil spring $25_1$ is formed such that a few turns of the coil spring $25_1$, located in the vicinity of the valve $23_1$ and identified by reference numeral $25a$, are designed to have an inner diameter appreciably smaller than the outer diameter of the connector $26_1$, whereas the remainder of the coil spring $25_1$ has its inner diameter larger than the outer diameter of the connector $26_1$. Upon assembly, the few turns $25a$ of the coil spring $25_1$ are radially expanded so as to be firmly fitted onto the left end part of the connector $26_1$.

In the FIG. 6 modification, the left end part of the connector $26_1$ corresponding to a few turns of the coil spring $25_1$ is designed such that its outer diameter is appreciably larger than the inner diameter of the coil spring $25_1$, whereas the other part of the connector $26_1$ has its outer diameter smaller than the inner diameter of the coil spring $25_1$. The left end part of the coil spring $25_1$ comprising a few turns thereof is expanded so as to be firmly fitted onto the enlarged end part of the connector $26_1$.

As is readily apparent from FIG. 2, the free movement clearance $l_2$ is dimensioned larger than the distance $l_1$ by which the differential pistons $9_1$ and $9_2$ are displaced from the opened position to the closed position relative to the valves $23_1$ and $23_2$ but it is dimensioned smaller than the sum of the distance $l_1$ and the distance $l_3$ by which the washers $16_1$ and $16_2$ are displaced from the shoulders $15_1$ and $15_2$ of the smaller cylinder bores $10_1$ and $10_2$. The abovementioned dimensional relations will be represented by way of the following inequalities.

$$l_2 > l_1 \qquad (1)$$

$$l_2 < l_1 + l_3 \qquad (2)$$

The respective valve actuating pistons $11_1$ and $11_2$ are fitted on their outer peripheries with sealing members $35_1$ and $35_2$ such as O-ring or the like which are brought in close contact with the inner wall of the smaller cylinder bores $10_1$ and $10_2$. The sealing members $35_1$ and $35_2$ are located so that they are not disengaged from the smaller cylinder bores $10_1$ and $10_2$ when the respective valve actuating pistons $11_1$ and $11_2$ are displaced by the aforesaid distance $l_3$ relative to the differential pistons $9_1$ and $9_2$.

Further, to ensure that the differential pistons $9_1$, $9_2$ can be separately displaced by the distance $l_1$ without any interference caused by the other differential piston, the minimum clearance $l_4$ is provided between both the differential pistons $9_1$ and $9_2$. Thus, the clearance $l_4$ is dimensioned to be equal to or slightly greater than two times the distance $l_1$. This can be represented by way of the following inequality.

$$l_4 \geq 2 \times l_1 \qquad (3)$$

Further, the distance $l_5$, by which the respective valve actuating pistons $11_1$ and $11_2$ are displaced away from the washers $16_1$ and $16_2$ in the outward direction, is dimensioned to be equal to or greater than the sum of the distance $l_3$ and $l_4$. Therefore, the distance $l_5$ can be represented by way of the following inequality.

$$l_5 \geq l_3 + l_4 \qquad (4)$$

At the joint portion of the housings $3_1$ and $3_2$ is formed a small hole 28 which communicates the interiors of the housings $3_1$ and $3_2$ with the outside atmosphere with a sealing member 29 being fitted in a recess in the joint portion for the purpose of preventing dust or foreign material from entering the housing interiors from the outside. This sealing member 29 is designed so as to allow working liquid to flow out of the interiors of the housings $3_1$ and $3_2$. Specifically, in case working liquid leaks into the larger bores $8_1$ and $8_2$ due to the damage or injury of the sealing members $30_1$ and $30_2$, disposed between the differential pistons $9_1$ and $9_2$ and the cylinder bores $7_1$ and $7_2$ and the sealing members $35_1$ and $35_2$ disposed between the differential pistons $9_1$ and $9_2$ and the valve actuating pistons $11_1$ and $11_2$, the leaked working liquid flows through the sealing member 29 and the hole 28 into a reservoir for the master cylinder M whereby a trouble or failure can be detected by way of an abnormal fall of the liquid level in the reservoir.

Now operation of the hydraulic braking pressure control device in accordance with the above-mentioned embodiment of the present invention will be described below.

In an operative condition of the master cylinder M, the differential pistons $9_1$ and $9_2$ are urged to the outermost ends, as shown in FIG. 2, under the preset load exerted by the pressure control spring 12 and the positioning spring 17 thereby to open the valves $23_1$ and $23_2$. As a result, the first hydraulic input chamber $18_1$ is in communication with the first hydraulic output chamber $19_1$, while the second hydraulic input chamber $18_2$ is in communication with the second hydraulic output chamber $19_2$. In this state, when the brake pedal 1 is depressed, hydraulic pressure generated in the master cylinder M is transferred downstream of the first and second hydraulic lines $L_1$ and $L_2$ to simultaneously actuate the front wheel brakes $B_f$ an $B_f'$ and the rear wheel brakes $B_r$ and $B_r'$.

As output pressure from the master cylinder M is increased, pressure in the first hydraulic input and output chambers $18_1$ and $19_1$ and in the second hydraulic input and output chambers $18_2$ and $19_2$ is correspondingly increased. When it reaches a predetermined level, differential pressure exerted on the differential pistons $9_1$ and $9_2$ due to difference in pressure-receiving areas on the opposite sides thereof becomes larger than the preset load given by the pressure control spring 12 and the positioning spring 17. As a result, the differential pistons $9_1$ and $9_2$ slide in the inward direction, while compressing both the pressure control spring 12 and the positioning spring 17. Due to the existence of an appreciable pressure difference between both the hydraulic inlet chambers $18_1$ and $18_2$, the valve actuating pistons $11_1$ and $11_2$ are caused to displace in the leftward direction or in the rightward direction, but the stoppers $27_1$ and $27_2$ of the valve actuating pistons $11_1$ and $11_2$ remain out of engagement with the connectors $26_1$ and $26_2$ because of the inequality (1) which represents a dimensional relation $l_2 > l_1$ so that the valve opening rods $24_1$ and $24_2$ are kept in abutment against the end walls of the cylinder bores $7_1$ and $7_2$ because the valves $23_1$ and $23_2$ are urged outward by means of the coil springs $25_1$ and $25_2$. However, when the differential pistons $9_1$ and $9_2$ are displaced in the inward direction by the distance $l_1$, the valves $23_1$ and $23_2$ close the communication holes $22_1$ and $22_2$. Thereafter no increase in hydraulic braking pressure is caused for the rear wheels.

As hydraulic output pressure from the master cylinder M is increased further, hydraulic pressure in the hydraulic input chambers $18_1$ and $18_2$ is correspondingly increased whereby the respective differential pistons $9_1$ and $9_2$ are displaced in the outward direction. As a result, the valves $23_1$ and $23_2$ are caused to open again to increase the hydraulic pressure in the hydraulic output chambers $19_1$ and $19_2$. When the hydraulic pressure in the chambers $19_1$ and $19_2$ has reached a certain level, the differential pistons $9_1$ and $9_2$ are displaced in such a direction as to close the communication holes $22_1$ and $22_2$, thereby preventing further pressure increase. By repeating the above operation, it is ensured that braking pressure for the rear wheels is gradually increased step by step.

On the other hand, as hydraulic output pressure from the master cylinder M is transferred directly to the front wheel brakes $B_f$ and $B_f'$, front wheel braking pressure is quickly increased in correspondence to an increase in the hydraulic output pressure from the master cylinder M. Thus, effective braking operation is ensured without any occurrence of skidding with the respective wheels, since the arrangement is such that when powerful braking takes place, the front wheels with an increased load exerted thereon due to the forward inclination of the vehicle body is subjected to powerful braking by the front wheel brakes $B_f$ and $B_f'$, while the rear wheels with a reduced load exerted thereon is subjected to weak braking by the rear wheel brakes $B_r$ and $B_r'$.

Next, description will be made with respect to the case where no hydraulic braking pressure is applied to the hydraulic actuating mechanism in either of the rear wheel brakes, for instance, the rear wheel brake $B_r'$ because of some trouble with either of the hydraulic braking pressure lines, for instance, the second hydraulic line $L_2$. When depressing the brake pedal 1, hydraulic output pressure from the master cylinder M is transferred only to the first hydraulic line $L_1$ to increase hydraulic pressure in the frist hydraulic input chamber $18_1$, whereas no pressure increase is caused in the second hydraulic input chamber $18_2$. Thus, the valve actuating piston $11_1$ is first displaced inward (to the right as seen in the drawing) against the resilient force of the weak positioning spring 17 to place the washer $16_1$ in abutment against the inside shoulder $14_1$ in the smaller cylinder bore $10_1$. Then, the differential piston $9_1$ is displaced inward together with the valve actuating piston $11_1$ against the resilient force of the strong pressure control spring 12. This inward displacement of the differential piston $9_1$ comes to a stop when the innermost end of the differential piston $9_1$ is brought in contact with the innermost end of the differential piston $9_2$. Therefore, the total displacement of the valve actuating piston $11_1$ can be represented by the sum $(l_3 + l_4)$. At this moment, the right-hand valve actuating piston $11_2$ is urged to displace the same distance by means of the left-hand valve actuating piston $11_1$ without any hindrance because of the existence of the aforesaid inequality (4), that is $l_5 \geq l_3 + l_4$.

When the valve actuating piston $11_1$ is displaced by a distance longer than the predetermined distance $l_2$ relative to the differential piston $9_1$ within the range of the total displacement $l_3 + l_4$, the stopper $27_1$ at the outermost end of the valve actuating piston $11_1$ comes in engagement with the inside end wall $26b$ of the connector $26_1$ to displace the valve $23_1$ inwardly apart from the end wall of the smaller cylinder bore $10_1$ to open the valve $23_1$ on account of the aforesaid inequality (2), that is $l_2 < l_1 + l_3$. As a result, hydraulic output pressure from the master cylinder M is transferred to the first hydraulic output chamber $19_1$ whereby the front wheel brake $B_f$ and the rear wheel brake $B_r$ in the first hydraulic line $L_1$ are actuated at the same intensity. Thus, the hydraulic braking pressure control device of the present invention is given a by-pass function.

It should be noted that the characteristic feature of the hydraulic braking pressure control device consists in that the amount $l_3$ of inward displacement of the valve actuating piston $11_1$ relative to the differential piston $9_1$ is limited by the inside shoulder $14_1$ formed in the end part of the differential piston $9_1$, the inside shoulder $14_1$ serving as a sort of stopper. Owing to this arrangement, even when the valve actuating piston $11_1$ is caused under the pressure in the first hydraulic input chamber $18_1$ to displace to the right in advance of the differential piston $9_1$, displacement of the differential piston $9_1$ is limited only within the minimum distance required for opening the valve $23_1$, so that the sealing member $35_1$, disposed on the outer periphery of the valve actuating piston $11_1$, is positively prevented from disengagement with the smaller cylinder bore $10_1$. As a result, any leakage of hydraulic pressure in the first hydraulic input chamber $18_1$ from the smaller cylinder bore $10_1$ is perfectly prevented by means of the sealing member $35_1$.

In case where the brake pedal 1 is depressed while the first hydraulic line $L_2$ is out of operation, the members and components in the hydraulic braking pressure control device are operated in the same manner as the foregoing but in the opposite direction.

In the above-mentioned embodiment, the valve actuating pistons $11_1$ and $11_2$ are constructed separate from one another, but they may be united to a single member, provided that no problem occurs relative to machining accuracy.

While a presently preferred embodiment of the present invention is shown and described, it should be apparent to those skilled in the art that various changes and modifications can be made therein without departing from the spirit of the invention or the scope of the appended claims.

What is claimed is:

1. A hydraulic braking pressure control device in a braking system for a vehicle in which hydraulic output pressure from a master cylinder is separately fed to a pair of rear wheel brakes by way of independent first and second hydraulic lines, the device comprising in combination:
    a housing disposed commonly in said first and second hydraulic lines and having a cylinder bore defined therein;
    a pair of differential pistons slidably received in said cylinder bore to define at their inner ends a first and a second hydraulic input chamber in communication with the upstream sides of said first and second hydraulic lines, respectively, and at their outer ends a first and a second hydraulic output chamber in communication with the downstream sides said first and second hydraulic lines, respectively, said differential pistons each having on the opposite sides thereof a first pressure receiving area facing the associated one of said hydraulic output chambers and a second pressure receiving area facing the associated one of said hydraulic input chambers, said first pressure receiving area being greater than said second pressure receiving area, said differential pistons being each formed with a communication passage through which said associated hydraulic input and output chambers communicate with each other;
    a pressure control spring arranged between said differential pistons for urging them in a direction away from one another;
    a pair of valves adapted to open or close said communication passages in accordance with the sliding movements of said respective differential pistons;
    a valve actuating means arranged between said first and second hydraulic input chambers and adapted to keep one of said valves in an open state when it is moved under a pressure differential between said first and second hydraulic input chambers by a distance greater than a predetermined value, said valve actuating means comprising a pair of valve actuating pistons which are formed at their inner end portions with a pair of oppositely disposed shoulders; and
    a positioning spring arranged between said opposite shoulders for urging said valve actuating pistons in a direction away from one another, said shoulders of the valve actuating pistons and the inner end faces of said differential pistons cooperating together to limit relative axially inward displacements of the valve actuating pistons with respect to the differential pistons to a predetermined extent.

2. A hydraulic braking pressure control device as defined in claim 1, said hydraulic braking pressure control device further comprising a pair of washers adapted to abut against said shoulders and the inner end faces of said differential pistons, said positioning spring being arranged between said washers for urging through said washers said valve actuating pistons in a direction away from one another.

3. A hydraulic braking pressure control device as defined in claim 1, wherein said differential pistons are formed on the outer peripheries thereof with a pair of opposing shoulders, said pressure control spring being arranged between the oppositely disposed shoulders of said differential pistons in encircling relation with the inner end parts of said respective differential pistons.

4. A hydraulic braking pressure control device as defined in claim 1, wherein said valve actuating means is slidably received in said first and second hydraulic input chambers with sealing members fitted on the opposite end part thereof, said differential pistons being each formed with a stopper for defining the displacement limit of said valve actuating means toward the oppositely disposed differential piston.

5. A hydraulic braking pressure control device as defined in claim 1, comprising a pair of springs arranged between said valve actuating means and the associated end faces of said valves for urging them in a direction away from one another, and a pair of connector assemblies adapted to connect said valve and said valve actuating means with a predetermined amount of free displacement distance provided therebetween.

6. A hydraulic braking pressure control device as defined in claim 5, wherein each of said connector assemblies comprises in combination:
    a pair of connecting rods axially projected from the oppositely disposed end faces of said valve and said valve actuating means;
    a cylindrical connector having opposite end walls, and including a plurality of radially divided connector segments;
    said connecting rods slidably extending through the opposite end walls of said connector; and
    stoppers each provided at the free end of each of said connecting rods so as to come in abutment against the inside faces of the opposite end walls of said connector, one of said stoppers being spaced from the corresponding end wall of said connector with a predetermined amount of free movement distance provided therebetween.

7. A hydraulic braking pressure control device as defined in claim 6, wherein said spring arranged between the end faces of said valves and said valve actuating means comprises a coil spring encasing said connector so as to hold said connector segments in a cylindrical configuration.

8. A hydraulic braking pressure control device as defined in claim 7, wherein said coil spring is firmly fitted at its one end onto that end of said connector which is located opposite to its other end at which said free displacement distance is provided, while the other part of said coil spring excluding said one end part thereof is spaced from the outer periphery of said connector with a close clearance formed therebetween.

* * * * *